July 3, 1923.
C. P. L. HUSTON
1,460,654
INSULATED HANDLE FOR TOOLS
Original Filed April 2, 1919
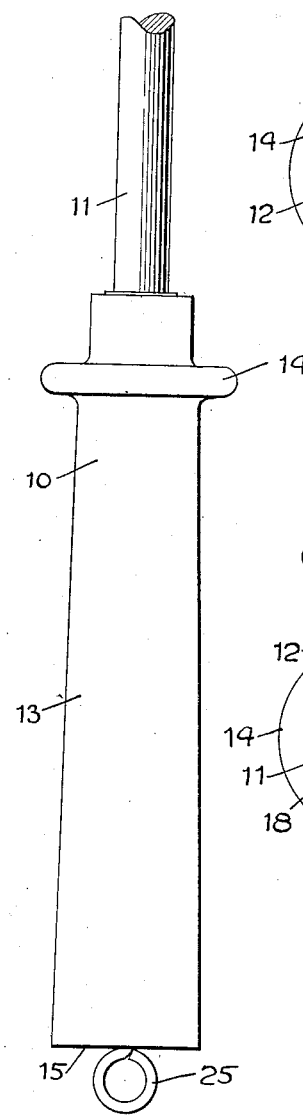
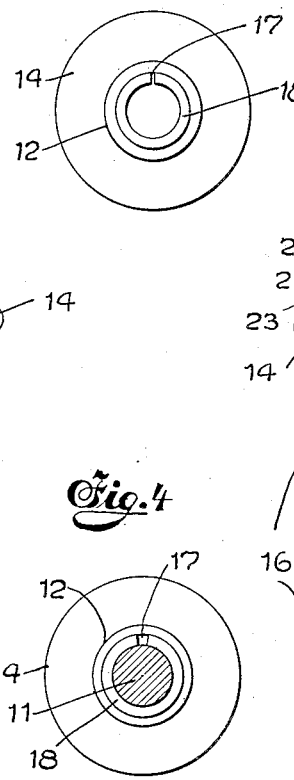
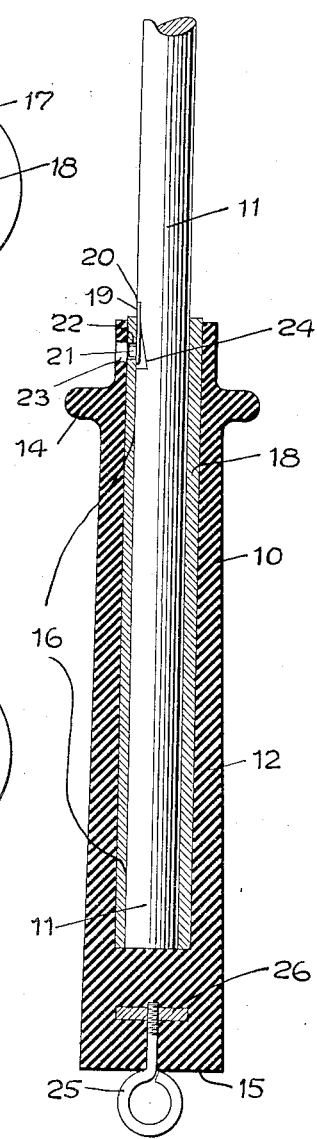
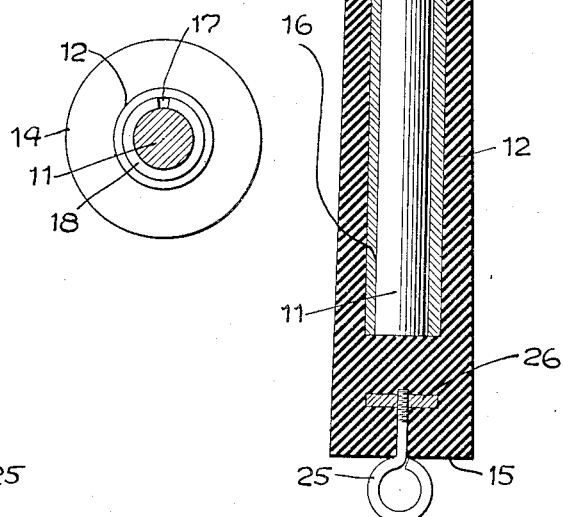

Patented July 3, 1923.

1,460,654

UNITED STATES PATENT OFFICE.

CHARLES P. L. HUSTON, OF PLAINFIELD, NEW JERSEY.

INSULATED HANDLE FOR TOOLS.

Application filed April 2, 1919, Serial No. 286,917. Renewed August 4, 1922, Serial No. 579,772.

*To all whom it may concern:*

Be it known that I, CHARLES P. L. HUSTON, a citizen of the United States of America, and a resident of the town of Plainfield, in the county of Union and State of New Jersey, have invented an Improvement in Insulated Handles for Tools, of which the following is a specification.

My invention relates to insulated handles for tools. An object of my invention is to produce a simple and efficient device which is inexpensive to manufacture and can be applied to the shank of a tool with great ease and celerity. Another object of my invention is to produce a handle that is more particularly adapted to tools that are used for cutting comparatively thick metal and tools that are used for electric work where the user might be subjected to shocks. Other objects will be in part obvious and will be pointed out in the following specification.

Reference will be had to the accompanying drawings forming a part of this specification in which similar reference characters indicate corresponding parts throughout the several views.

Figure 1 is a plan view of my invention.

Figure 2 is a longitudinal cross-section of Figure 1.

Figure 3 is an end view of the handle before the shank is inserted.

Figure 4 is a similar view after the shank is inserted.

Referring to the drawings, I have shown by way of example merely, a handle 10, which is adapted to be used in connection with the shank of a tool 11, and which comprises a tubular insulating portion 12, having an elongated grip portion 13, a hand guard portion 14, and an end portion 15. The insulating part 12 of the handle 10 is preferably made of vulcanized rubber which is vulcanized to such an extent that it allows of great resiliency, insures a substantial grip to the user, and also insulates the handle so as to prevent possible shock of the user from electricity. Located within the insulating portion 12 is the tubular member 18, which is preferably of resilient metal and preferably approximates in cross section the shape of the shank of the tool to which the handle is to be applied. Tubular member 18 is slotted as indicated at 17 preferably throughout its entire length. It will be understood that the rubber cover member 12 is vulcanized to the tubular member 18 while the tubular member is in the contracted position as shown in Figure 3 so as to produce a smooth surface of rubber surrounding the tubular member 18 and also to prevent any rubber from being pressed in the slot 17. This allows the tubular member 18 to contract completely without having any rubber in the slot 17 to retard or prevent its contraction, which might occur if the handle were vulcanized when the tubular member is expanded. Metallic tubular member 18 preferably extends substantially the entire length of the handle so as to obtain a long gripping surface upon the shank of the tool and give ample support to the soft rubber covering 12.

It will be seen that the handle can be applied to the shank of any tool by merely inserting the shank 11 into the ferrule or tubular member 18, which is embedded within the insulating member 12. It will be understood that the shank 11 may vary slightly in diameter, so I prefer to make the tubular member 18 rather thin so it can be easily expanded when a shank of maximum diameter is inserted into this tube 18. It will be understood that this tubular member 18 can be made in any desired cross section, such as square for example, to adapt itself to the cross section of the shank 11. The rubber insulating material 12, which surrounds the tubular member 18, supplies an additional resiliency to the aforesaid mentioned tubular member 18. It will be seen that when the shank 11 is inserted in the tubular member 18, the tubular member 18 is expanded as shown in Figure 4 and therefore by means of its resiliency assisted by the resiliency of the insulating material 12, it will firmly grip the shank 11. I have supplied an additional locking means which can be used if desired but is not essential, which consists of a leaf-spring 19 connected to the shank 11, as shown at 20, having a button 21 thereon which projects through the aperture 22 in the tubular member 18, thereby locking said shank 11 to the handle 10. This locking device prevents rotation of the handle in relation to the shank, and also prevents the handle 10 from slipping off the shank 11. For releasing this locking device, it is necessary to insert a nail, for example, in the aperture 23 in the insulated part of the handle 12 and depress the leaf-spring 19 against the back wall of the recess 24 in the shank 11. It will be understood that this additional locking device is used when the handles are interchangeable with various tools, that is if the diameters of the shank 11 and the tubular member 18 should decrease by wear from usage to such an extent that the tubular member 18 will not contract enough to substantially grip the shank 11. Attached to the end 15 of the handle is a screw-eye 25 which is connected to a washer 26, embedded in the insulating material 12. This screw-eye may be used for the purpose of protecting the end 15 of the handle and also for the purpose of suspending the handle or tool in any desired place.

It will be understood that I do not wish to confine myself to any particular configuration of handle as many designs or uses may be used for this handle without departing from the spirit of the invention.

I claim:

1. In a device of the class described, in combination, an insulated handle adapted to be used in connection with the shank of a tool, and resilient means associated with and mounted within said handle for gripping said shank.

2. An insulated handle adapted to be used in connection with the shank of a tool, said handle comprising a resilient insulating member, and a resilient tubular member within said insulating member for securing said handle to the aforesaid shank of a tool.

3. An insulated handle adapted to be used in connection with the shank of a tool, said handle comprising a resilient insulating member, and a split expandable tubular member for securing said handle to the aforesaid shank of a tool.

4. An insulated handle adapted to be used in connection with the shank of a tool, said handle comprising a resilient insulating member, and a resilient tubular member within said insulating member and of substantially the same length as the aforesaid insulating member for securing said handle to the aforesaid shank of a tool.

5. An insulated handle adapted to be used in connection with the shank of a tool, said handle comprising a resilient insulating member, and a resilient slotted metallic tubular member within said insulating member, having a slot substantially the same length as the aforesaid tubular member, for gripping the aforesaid shank of a tool.

6. An insulated handle adapted to be used in connection with the shank of a tool, said handle comprising a resilient tubular insulating member, a split tubular member within said insulating member for gripping the aforesaid shank of a tool, and means for locking said shank, which means serves to prevent the removal and rotation of said shank.

7. An insulated handle adapted to be used in connection with a shank of a tool, said handle comprising a resilient rubber tubular member, a resilient metallic member within said rubber tubular member and extending substantially the full length of the aforesaid rubber tubular member for removably securing said handle to the aforesaid shank of a tool.

8. An insulated handle adapted to be used in connection with the shank of a tool, said handle comprising a resilient insulating tubular member, a slotted tubular member within said insulating tubular member having a slot substantially the full length of said tubular member, and means for locking said tubular member to the aforesaid shank of a tool which means serves to prevent removal and rotation of the shank.

9. In a device of the character described, in combination, a substantially tubular resilient member forming a handle, a second resilient member within said first resilient member and adapted to receive the shank of a tool, said resilient members co-acting by their resiliency to grip the aforesaid shank to prevent relative rotational movement between said resilient members and said shank, and means for preventing relative longitudinal movement between said members and said shank.

10. A handle, adapted to be used in connection with the shank of a tool, comprising a metallic slotted member and a rubber cover vulcanized thereto and extending over the slot therein, said metallic member and said rubber cover co-acting to resiliently grip said shank.

11. A handle, adapted to be used in connection with the shank of a tool, comprising a resiliently acting metallic slotted member for gripping said shank, and a rubber cover vulcanized upon the exterior of said metallic member and extending over the slot therein and adapted to reinforce and assist said metallic member in resiliently gripping said shank.

12. A handle for use in connection with the shank of a tool comprising a resilient member adapted to grip, a second resilient member also having ability to grip and arranged to maintain itself on a shank, said first gripping member adapted to surround the second gripping member and to co-act therewith to firmly secure said members to said shank.

In testimony whereof, I have signed my name to this specification this 19th day of March, 1919.

CHARLES P. L. HUSTON.